United States Patent
Westerling

(10) Patent No.: US 11,503,025 B2
(45) Date of Patent: Nov. 15, 2022

(54) SOLUTION FOR RECEIVING NETWORK SERVICE

(71) Applicant: Telia Company AB, Solna (SE)

(72) Inventor: Jarkko Westerling, Espoo (FI)

(73) Assignee: TELIA COMPANY AB, Solna (SE)

( * ) Notice: Subject to any disclaimer, the term of this patent is extended or adjusted under 35 U.S.C. 154(b) by 323 days.

(21) Appl. No.: 16/716,981

(22) Filed: Dec. 17, 2019

(65) Prior Publication Data

US 2020/0195643 A1 Jun. 18, 2020

(30) Foreign Application Priority Data

Dec. 17, 2018 (FI) ........................ 20186093

(51) Int. Cl.
*H04L 9/40* (2022.01)
*H04L 45/74* (2022.01)

(52) U.S. Cl.
CPC .......... *H04L 63/0884* (2013.01); *H04L 45/74* (2013.01); *H04L 63/0876* (2013.01); *H04L 63/10* (2013.01)

(58) Field of Classification Search
CPC . H04L 63/0884; H04L 63/0876; H04L 63/10; H04L 63/0892; H04L 63/0853; H04L 63/08; H04L 45/74; H04L 61/6004
See application file for complete search history.

(56) References Cited

U.S. PATENT DOCUMENTS

| | | | | |
|---|---|---|---|---|
| 7,469,294 B1* | 12/2008 | Luo | ...................... | H04L 63/0272 370/406 |
| 2008/0155678 A1* | 6/2008 | Oh | ...................... | H04L 63/0892 726/15 |
| 2010/0125898 A1* | 5/2010 | Dubuc | ................ | H04L 63/0892 726/7 |
| 2014/0059650 A1* | 2/2014 | Bhayankara | ........ | H04L 63/0892 726/4 |
| 2018/0332471 A1* | 11/2018 | Zhu | ...................... | H04W 12/041 |
| 2019/0013968 A1* | 1/2019 | Xie | ...................... | H04L 63/0884 |
| 2019/0253409 A1* | 8/2019 | Spencer | ................ | H04W 12/73 |

FOREIGN PATENT DOCUMENTS

| | | |
|---|---|---|
| EP | 3410648 A1 | 12/2018 |
| GB | 2554953 A | 4/2018 |
| WO | 2017/039494 A1 | 3/2017 |

OTHER PUBLICATIONS

European Search Report issued in European Patent Application No. EP 19 21 5865 dated Feb. 12, 2020.
FI Search Report, dated Jun. 13, 2019, from corresponding FI application No. 20186093.

(Continued)

*Primary Examiner* — Khoi V Le
(74) *Attorney, Agent, or Firm* — Nixon & Vanderhye

(57) ABSTRACT

Disclosed is a method including: receiving, by a routing device, a message; determining an indication of an authentication server for authenticating the user to access the network service; and generating an authentication request including at least the user identifier derived from the data structure to the determined authentication server. Also disclosed is a routing device and a computer program product.

11 Claims, 3 Drawing Sheets

(56) References Cited

OTHER PUBLICATIONS

Rigner et al., "RFC 2875. Remote Authentication Dial In User Service (RADIUS). IETF", 2000, Retrieved from <https://tools.ietf.org/pdf/rfc2865.pdf>.
Office Action issued in the corresponding European Patent Application No. 19 215 865.7 dated Apr. 12, 2021.
Anonymous, "Network Access Identifier—Wikipedia", Nov. 21, 2018, XP055792584, Retrieved from the internet: URL:https://web.archive.org/web/20181121115557/https://en.wikipedia.org/wiki/Network_Access_Identifier [retrieved on Apr. 6, 2021].

* cited by examiner

| Routing address | | | User address | | |
|---|---|---|---|---|---|
| Country | Operator | Region related fields | Corporate tag (or type) | Country | UserID |

SOLUTION FOR RECEIVING NETWORK SERVICE

TECHNICAL FIELD

The invention concerns in general the technical field of communication networks. More particularly, the invention concerns accessing to a network.

BACKGROUND

A tremendous development in a field of digital communication has enabled provision of digital services through a communication network, such as internet. This, in turn, has increased data traffic in the communication network and increased requirements for network nodes enabling the data traffic.

Fundamentally thinking accessing the communication network and utilizing the services therein requires at least that routing between a source device and a destination device must be implemented and typically the access to a service requires authentication of a user at least to some extent. More specifically, the routing refers to an implementation by means of which a communication path between the source device and the destination device may be selected in the network. In packet data networks the routing is a high-level approach that directs network packets from the source device to the destination device through intermediate network nodes by forwarding the packet towards the destination. The intermediate network nodes refer to routers, bridges, gateways, firewalls and switches, for example. The routing is implemented by utilizing so called routing tables, which maintain a record of the routes to various network destinations. The routing tables are held router's memory and necessary information is obtained therefrom when routing operation is performed.

One challenge with the existing network implementation is that due to the increase of data traffic, and hence due to increase of network nodes in the communication networks and in the communication path, the size of the routing tables has become large whereas storage space in the routing devices is typically limited. Hence, it may turn out that the routing devices cannot perform their duty in the communication network.

Hence, there is need to develop further solutions for implementing an access to a communication network, which mitigates, at least in part, the above described challenges among other.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present a method, a routing device and a computer program product for utilizing a network service. Another objective of the invention is that the method, the routing device and the computer program product enable an authentication of a user for utilizing the network service.

The objectives of the invention are reached by a method, a routing device and a computer program as defined by the respective independent claims.

According to a first aspect, a method is provided, the method comprising: receiving, by a routing device, a message, the message comprising a data structure including a user identifier of a user requesting a network service; determining, from the data structure, an indication of an authentication server for authenticating the user to access the network service; and generating an authentication request comprising at least the user identifier derived from the data structure to the determined authentication server.

The message may be received from a user equipment, wherein: the user identifier may be obtained from a medium accessible by the user equipment; the message comprising the data structure including the user identifier may be generated; and the generated message comprising the data structure including the user identifier may be transmitted to the routing device.

An outcome of a determination of the data structure may be the indication expressing one of the following: (i) the authentication server is a public authentication server, (ii) the authentication server is a private authentication server.

Further, the indication may be dependent on a value of a data field in the data structure.

In response to a detection that the authentication server is the public authentication server, the determination of the indication of the authentication server may comprise a step of deriving a location of the public authentication server.

The method may further comprise: receiving, in response to the generation of the request to the determined authentication server, a confirmation that the user identifier is valid, and adding the user represented with the user identifier to a routing table for allowing the user to access the requested network service.

It may also be arranged that in response to a detection that the authentication server is the private authentication server, the generation of the authentication request to the determined authentication server may comprise: indicating a connection request in the authentication request to the private authentication server by setting a user address derived from the data structure as a source of the communication; and receiving a connection request from the authentication server to the user equipment over a secured connection.

A data entry of the user may be added in a routing table of the routing device. The data entry may comprise a routing address of the user with the user identifier.

According to a second aspect, a routing device is provided, the routing device comprising: at least one processor; at least one memory including computer program code; the at least one memory and the computer program code configured to, with the at least one processor, cause the routing device to perform: receive a message, the message comprising a data structure including a user identifier of a user requesting a network service; determine, from the data structure, an indication of an authentication server for authenticating the user to access the network service; and generate an authentication request comprising at least the user identifier derived from the data structure to the determined authentication server.

The routing device may be configured to generate as an outcome of a determination of the data structure the indication expressing one of the following: (i) the authentication server is a public authentication server, (ii) the authentication server is a private authentication server.

Alternatively or in addition, the routing device may be configured to, in response to a detection that the authentication server is the public authentication server, to perform the determination of the indication of the authentication server by deriving a location of the public authentication server.

The routing device may also be configured to receive, in response to the generation of the request to the determined authentication server, a confirmation that the user identifier is valid, and to add the user represented with the user identifier to a routing table for allowing the user to access the requested network service.

Further, the routing device may be configured to, in response to a detection that the authentication server is the private authentication server, perform the generation of the authentication request to the determined authentication server by: indicating a connection request in the authentication request to the private authentication server by setting a user address derived from the data structure as a source of the communication; and receiving a connection request from the authentication server to the user equipment over a secured connection.

According to a third aspect, a computer program product is provided which, when executed by at least one processor, cause a routing device to perform the method as described above.

The expression "a number of" refers herein to any positive integer starting from one, e.g. to one, two, or three.

The expression "a plurality of" refers herein to any positive integer starting from two, e.g. to two, three, or four.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Figures 1, 2:
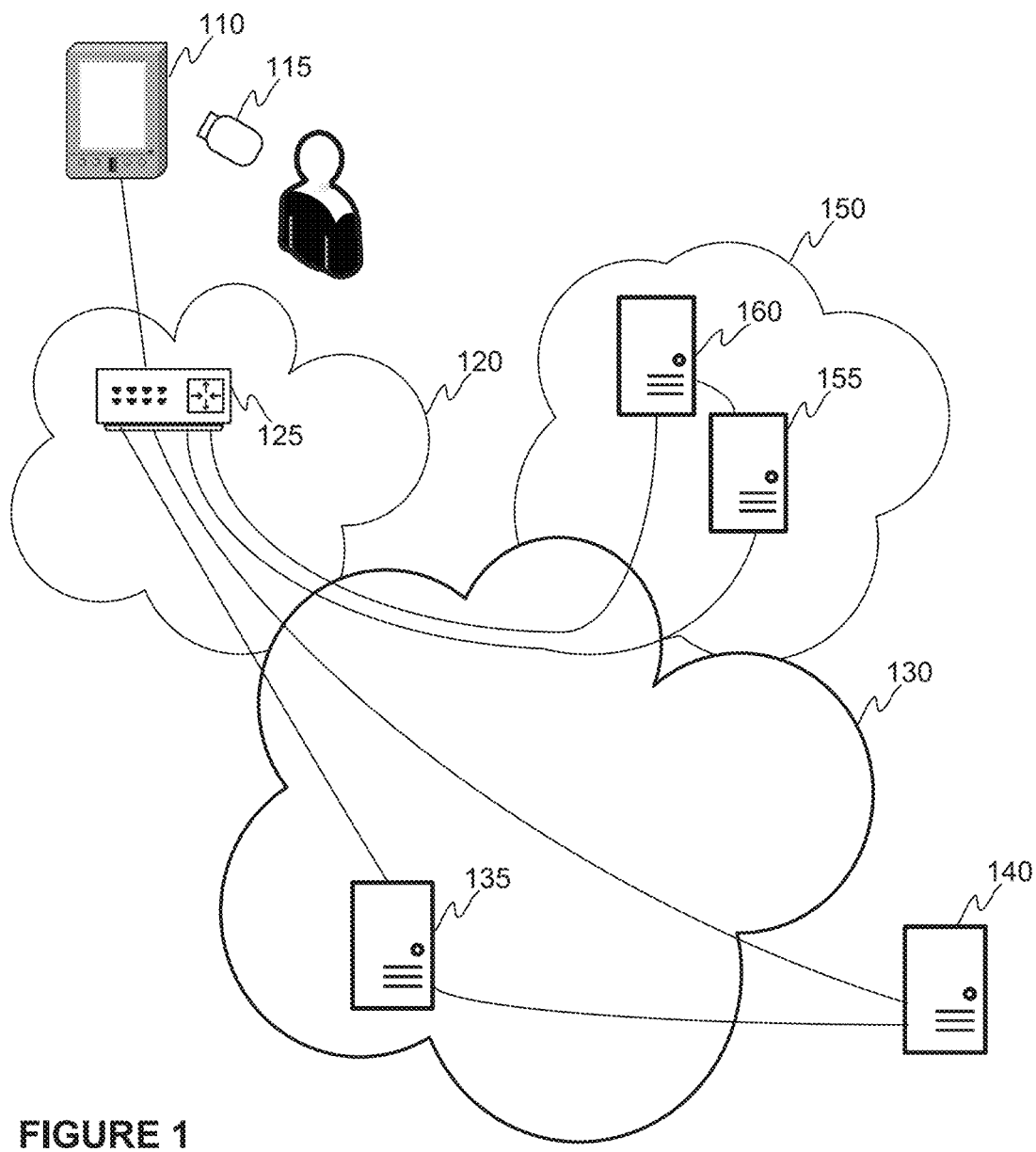
FIG. 1 illustrates schematically a communication system according to an embodiment of the invention.
FIG. 2 illustrates schematically an address structure according to an embodiment of the invention.

FIG. 1 schematically illustrates a non-limiting example of a communication environment, or a communication system, in which the present invention may be implemented to. The communication environment may comprise a user equipment 110 by means of which a user intends to access to a network service implemented in or through a communication network. The network service may e.g. be implemented in a server 135 residing in a global network 130, such as in Internet. The access from the user equipment 110 e.g. to the global network 130, and to the server 135, may be performed through a local network 120 comprising a routing device 125. According to the present invention a right to access to the network service may be granted, at least in part, through an authentication of the user by an authentication server 140. Alternatively or in addition, the user may be so-called corporate user who wish to use a network service provided by a private network 150, such as by a corporate IT system, like a server 160, and for this purpose the private network may comprise an authentication server 155 for performing operations as will be described.

For authentication a user identifier, referred by userID, is needed. The userID may advantageously be granted by a trusted party, such as by a telecom operator, by an authority or by a corporate, and it may require registration from the user in order to get the userID. In some embodiment, the userID is stored in a medium 115 which may be accessed by the user equipment 110. The medium 115 may e.g. be a memory card, USB memory, or any similar into which the userID may be stored. In some implementation the userID may be integrated in the user equipment 110 and stored in a memory therein. When establishing a connection to the network service the userID may be retrieved from the medium storing it. The retrieval of the userID may be performed through an interaction between the user and the user equipment 110. The interaction may e.g. refer to a provision of a password or a PIN code, or biometric recognition, or any similar, through which the user may identify himself or herself and, in that manner, grant a right to the user equipment 110, or an application executed by the user equipment 110, to access the userID stored in the medium storing it. For sake of clarity, it is worthwhile to mention that FIG. 1 is a non-limiting example of the present invention and does not necessarily illustrate all necessary devices and connections for achieving the communication as described.

The userID may be established in a form of character string, such as number string, preferably individually generated for each user. The userID may, according to some embodiments of the invention, be expressed as the number string by means of which it is possible to identify the user, either directly or indirectly, by an authentication server.

FIG. 2 schematically illustrates an example of an address structure applicable in a context of the present invention. The address structure may be based on a division of the addresses to two sections. The first section expresses a routing address and the second section expresses a user address. The routing address section may comprise fields indicating a country, an operator and any region related information for reaching the user equipment in the network, for example. The country information may e.g. specify the country in which the user equipment resides, and the operator information may comprise an identifier of the operator. The region related fields may determine the region in which the user equipment resides in the operator network, which is typically hierarchical, and may comprise regions and subregions at a necessary level. In a building of the hierarchical structure any network model, such as OSI model, may be used to. Naturally, the region related fields depend on the network technology used by the user equipment 110, and in case of wireless technology the region related fields may e.g. define a base station serving the user equipment, for example. The second section, in turn, may comprise fields indicating a corporate, a country and the userID as described above, for example. If the user is not a corporate user, the corporate field may be set to a value corresponding to a private user for which the value may e.g. be zero. Similarly, if the user is the corporate user the value may be set to a value corresponding to a corporate user. The country field under the user address may comprise a country identifier for indicating the country in which the userID is generated. Finally, the user address comprises the userID defining the user and is advantageously user specific. The fields disclosed herein are only examples, and a length of them may be adjusted so that any requirements may be achieved. As mentioned, the address structure illustrated in FIG. 2 is a non-limiting example according to an embodiment of the present invention. Further, a granularity of the mentioned pieces of information may be chosen according to a need.

Figure 3:
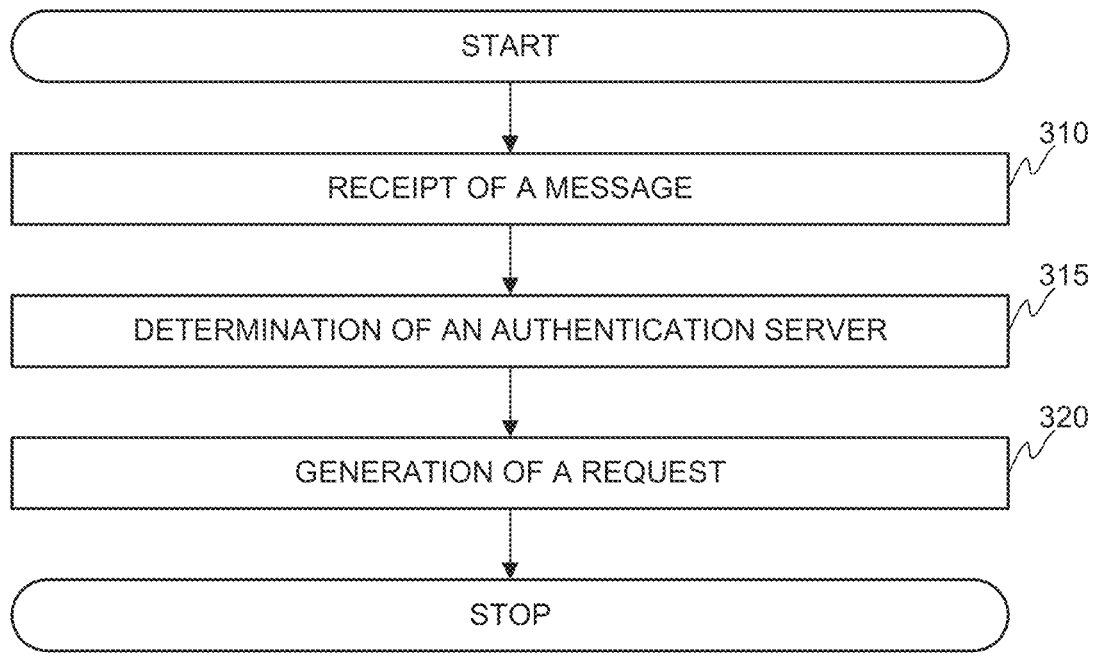
FIG. 3 illustrates schematically a method according to an embodiment of the invention.

Next, at least some aspects of the present invention are described by referring to FIG. 3 schematically illustrating at least some aspects of a method according to an embodiment of the invention. The method according to the embodiment of the invention is illustrated in FIG. 3 as a chain of operations primarily performed by a routing device 125 residing in the communication system. In the following the steps of the method according to the embodiment illustrated in FIG. 3 are discussed.

Regarding step 310:

At some point, the routing device 125 may receive a message from a user equipment 110, either directly or indirectly, over a communication channel. According to an embodiment of the invention the message comprises a data structure including a user identifier (userID) of a user requesting a network service with the message. The requested network service may refer to any kind of service provided by a network, such as access to a server implementing a certain service in the network, wherein the requested service may be indicated in one way or another in the message. The indication may e.g. be an identifier of the network service or a network address of a network entity implementing the service, for instance. The request of the network service may also refer to a dedicated authentication request associated with a network service request performed, or to be performed, with other messaging or signaling e.g. in response to a positive outcome of the authentication i.e. the user is authenticated to access the network service.

Regarding step 315:

In response to the receipt of the data structure in the message, the data structure comprising the userID, the routing device 125 may be configured to determine predetermined pieces of information from the received message. According to an embodiment of the invention the routing device 125 may be configured to determine an indication of an authentication server 140, 155 configured to authenticate the user for accessing the requested network service. The determination may be, at least in part, implemented on a basis of data in the data structure including the user identifier received in the message. Data in the data structure may e.g. refer to data included in a certain field in the data structure and/or absence of data in one or more fields in the data structure, for example. According to at least one embodiment of the present invention an outcome of the determination of the data in the data structure may be an indication expressing that the authentication server 140, 155 is a public authentication server 140 or that the authentication server is a private authentication server 155. The public authentication server 140 may refer to a server configured to implement authentication for users not requesting access to a network service provided by a private entity, such as by a corporate. An example of a user whose authentication may be arranged to be performed by the public authentication server 140 may e.g. be an individual user willing to access some public service implemented by at least one server device 135 in the communication network 130. On the other hand, an example of a user whose authentication may be arranged to be performed by the private authentication server 155 may be a corporate user requesting access to a corporate server 160 providing the requested network service. For avoidance of doubt, the network service may also refer to a broader concept than discussed above. Namely, according to an embodiment the network service may refer to an access to a certain network in general.

The determination of the indication on the authentication server 140, 155 may be dependent on a value of a data field in the data structure of the user identifier. According to an embodiment of invention the data field may be the one indicating if the user is corporate user or not. An example of the data field may be the corporate tag field as disclosed in the data structure of FIG. 2. For example, the routing device 125 may be configured to determine the value in the mentioned data field from the message and compare it to one or more stored values in a memory. If the comparison indicates a match between the value in the corporate tag field in the data structure and a stored value corresponding to a corporate user, the outcome of the determination may be an indication that the authentication server for authenticating the user in question is the private authentication server 155. If the value in the corporate tag field in the data structure does not match with a stored value corresponding to a corporate user, the outcome of the determination may be an indication that the authentication server for authenticating the user in question is the public authentication server 140.

Hence, the address structure as e.g. schematically illustrated in FIG. 2 comprises data from which an applicable authentication server for the user in question may be derived. In some embodiments a protocol used for authentication may be configured so that it automatically directs the data traffic to an authentication server dedicated for a county corresponding to the country identifier in the data structure.

Hence, a result of the step 315 may be that the routing device 125 is aware of the authentication server 140, 155 which is responsible for authenticating the user in question to access the requested network service. As described the information of the authentication server may be derived from data included in at least one data field of the data structure.

Regarding step 320:

In response to the determination of the indication of the authentication server the routing device 125 may be configured to generate an authentication request. The authentication request may advantageously be generated to the determined authentication server 140, 155 in a manner as will be described.

If the determined authentication server 140, 155 is the public authentication server 140 the routing device 125 may be configured to generate, by deriving a location of the determined authentication server 140 from the data structure of the user identifier, the authentication request to the public authentication server 140. The location of the determined authentication server may refer, according to an embodiment of the invention, to a country identifier included e.g. in a country field of a second section in the data structure of FIG. 2. In response to the determination of the location of the authentication server 140 the routing device 125 may generate the authentication request to a network address comprising the location of the authentication server 140, i.e. the country or a corporate, with the information of the user, i.e. the user identifier section from the data structure.

On the other hand, if the determined authentication server 140, 155 is the private authentication server 155, such as an authentication server configured to perform authentication for corporate users, the routing device 125 may be configured to generate the authentication request to the determined authentication server so that the authentication request may carry a connection request to the private authentication server 150 which, in response to a receipt of the authentication request and to a successful authentication of the user the private authentication server 155 may cause an establishment of a secure connection towards the user equipment e.g. through a firewall.

In both cases the routing device 125 may receive a confirmation on an outcome of the authentication and at least in case of the authentication has been successful, it may add the user address, and other necessary information, to the routing table maintained by the routing device 125 for implementing communication between the entities. The data entry added to the routing table may comprise the data in the data structure of FIG. 2.

Moreover, it may be arranged that the authentication server 140, 155 performing the authentication may inform one or more other entities, such as a server device configured to perform the requested service, on the outcome of the authentication.

Figure 4:
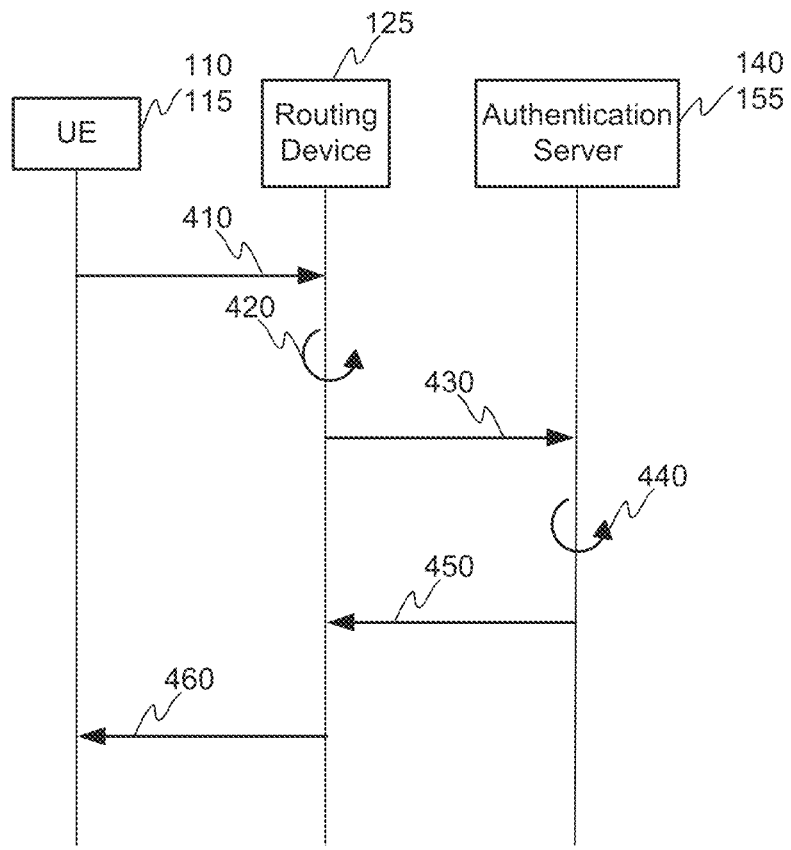
FIG. 4 illustrates schematically a signal flow according to an embodiment of the invention.

FIG. 4 illustrates schematically a non-limiting example of a signal flow according to an embodiment of the invention. The signal flow may start by a generation of a signal 410 e.g. in a form of a message by a user equipment 110 in the manner as described to a routing device 125. The signal may carry at least the address structure as schematically illustrated in FIG. 2 and an indication, in any form, that the user equipment requests a network service. The routing device 125 may at least be arranged to determine 420, 315 an authentication server 140, 155 being responsible for authenticating the user in question. Next, the routing device 125 may be arranged to generate an authentication request 430, 320 to the determined authentication server 140, 155. The authentication request may at least carry information of the user together with other data as described. The authentication server 140, 155 may be arranged to perform the authentication related operations, but also other operations 440, such as storing e.g. user location in data storage, such as a database. Depending on the outcome of the performed operations the authentication server 140, 155 may generate a message 450 for indicating to the routing device 125 if the authentication is successful or not. Furthermore, the routing device 125 may indicate the same to the user equipment 110, 115 (signal 460 in FIG. 4). In case the authentication result is positive, the user terminal 110 may start use the requested network service.

In addition to the description above the entities may be arranged to perform further signaling and/or deliver other pieces of data as described herein.

Figure 5:
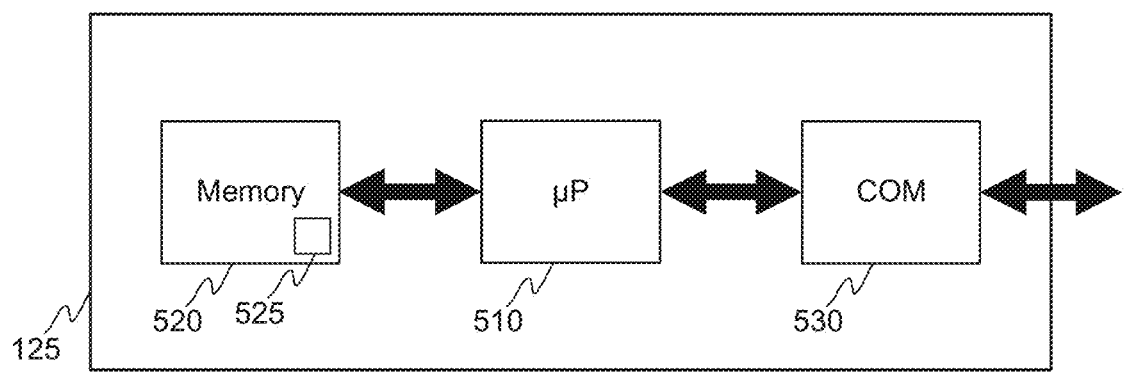
FIG. 5 illustrates schematically a routing device according to an embodiment of the invention.

FIG. 5 schematically illustrates an example of a routing device 125 arranged to perform at least a portion of the method as described. The routing device 125, when implemented as a device, may comprise a processing unit 510 comprising one or more processors, a memory unit 520 comprising one or more memory devices and a communication interface 530 comprising one or more communication devices, such as one or more modems, one or more data buses and/or one or more other devices or interfaces. Advantageously, the memory unit 520 may store portions of computer program code 525 and any other data, and the processing unit 510 may cause the routing device 125 to operate as described by executing at least some portions of the computer program code stored in the memory unit 520.

At least some aspects of the present invention may relate to a processor-readable non-transitory storage medium on which is stored one or more sets of processor executable instructions, e.g. in a form of portions of computer program code 525, configured to implement one or more of steps of the method as described. The instructions may also reside, completely or in part, within a main memory, the static memory, and/or within the processor during execution thereof by the at terminal device in question. The term computer-readable medium shall also cover, but is not limited to, solid-state memories such as a memory card or other package that houses one or more read-only (non-volatile) memories, random access memories, or other re-writable (volatile) memories; magneto-optical or optical medium such as a disk or tape; as well as carrier wave signals such as a signal embodying computer instructions in a transmission medium; and/or a digital file attachment to e-mail or other information archive or set of archives considered to be a distribution medium equivalent to a tangible storage medium.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A method that is performed by a routing device in communication with a communication network, comprising:
    receiving, via the network, a message for requesting access to a requested network service, the message comprising a data structure that includes a user identifier of a user requesting access to the requested network service and an indication of an authentication server, the indication of the authentication server expressing one of:
        (i) the authentication server is a public authentication server configured to implement authentication for users not requesting access to a network service provided by a private entity,
        (ii) the authentication server is a private authentication server configured to implement authentication for the user identifier requesting access to the network service provided by the private entity;
    generating and transmitting an authentication request comprising at least the user identifier derived from the data structure to the authentication server derived from the indication of the authentication server, for authenticating the user to access the requested network service; and
    receiving, in response to the generating and transmitting of the authentication request, a confirmation that the user identifier is valid, and adding the user represented with the user identifier to a routing table for allowing the user to access the requested network service.

2. The method of claim 1, wherein the message is received from a user equipment, wherein:

the user identifier is obtained from a medium accessible by the user equipment, the message comprising the data structure including the user identifier is generated, and the generated message comprising the data structure including the user identifier is transmitted to the routing device.

3. The method of claim 1, wherein, in response to a detection that the authentication server derived from the indication of the authentication server is the public authentication server, the routing device carries out a step of deriving a location of the public authentication server.

4. The method of claim 1, wherein, in response to a detection that the authentication server derived from the indication of the authentication server is the private authentication server, the generation of the authentication request to the authentication server derived from the indication of the authentication server comprises:

indicating a connection request in the authentication request to the private authentication server by setting a user address derived from the data structure as a source of the communication, and receiving a connection request from the authentication server to a user equipment of the user over a secured connection.

5. The method of claim 1, wherein a data entry of the user is added in a routing table of the routing device.

6. The method of claim 5, wherein the data entry comprises a routing address of the user with the user identifier.

7. A routing device, comprising:

at least one processor; and at least one memory including computer program code stored therein, the routing device configured to be in communication with a communication network, and the computer program code stored in the memory configured to, upon execution by the at least one processor, causing the routing device to perform operations of:

receiving, via the network, a message for requesting access to a requested network service, comprising a data structure that includes a user identifier of a user requesting access to the requested network service and an indication of an authentication server, the indication of the authentication server expressing one of: (i) the authentication server is a public authentication server configured to implement authentication for users not requesting access to a network service provided by a private entity, (ii) the authentication server is a private authentication server configured to implement authentication for the user identifier requesting access to the network service provided by the private entity;

generating and transmitting an authentication request comprising at least the user identifier derived from the data structure to the authentication server derived from the indication of the authentication server, for authenticating the user to access the requested network service; and receiving, in response to the generating and transmitting of the authentication request, a confirmation that the user identifier is valid, and adding the user represented with the user identifier to a routing table for allowing the user to access the requested network service.

8. The routing device of claim 7, wherein the routing device is further configured to, in response to a detection that the authentication server is the public authentication server, derive a location of the public authentication server.

9. The routing device of claim 7, wherein the routing device is configured to, in response to a detection that the authentication server derived from the indication of the authentication server is the private authentication server, perform the generation of the authentication request to the authentication server derived from the indication of the authentication server by:

indicating a connection request in the authentication request to the private authentication server by setting a user address derived from the data structure as a source of the communication, and receiving a connection request from the authentication server to a user equipment of the user over a secured connection.

10. A non-transitory computer-readable medium on which is stored a computer program which, when executed by a processor of a routing device, causes a routing device configured for communication with a communication network to perform the operations of:

receiving, via the network, a message for requesting access to a requested network service, the message comprising a data structure that includes a user identifier of a user requesting access to the requested network service and an indication of an authentication server, the indication of the authentication server expressing one of:

(i) the authentication server is a public authentication server configured to implement authentication for users not requesting access to a network service provided by a private entity, (ii) the authentication server is a private authentication server configured to implement authentication for the user identifier requesting access to the network service provided by the private entity;

generating and transmitting an authentication request comprising at least the user identifier derived from the data structure to the authentication server derived from the indication of the authentication server, for authenticating the user to access the requested network service; and receiving, in response to the generating and transmitting of the authentication request, a confirmation that the user identifier is valid, and adding the user represented with the user identifier to a routing table for allowing the user to access the requested network service.

11. The method of claim 2, wherein, in response to a detection that the authentication server derived from the indication of the authentication server is the public authentication server, the routing device carries out a step of deriving a location of the public authentication server.

* * * * *